(12) United States Patent
Zlatokrilov

(10) Patent No.: US 9,749,273 B2
(45) Date of Patent: Aug. 29, 2017

(54) ELECTRONIC MAIL DATA MANAGEMENT SYSTEMS AND METHODS FOR GENERATING A DATASET FOR SUCH SYSTEMS

(75) Inventor: Haim Zlatokrilov, Tel-Aviv (IL)

(73) Assignee: MAILWISE EMAIL SOLUTIONS LTD., Tel-Aviv (IL)

( * ) Notice: Subject to any disclaimer, the term of this patent is extended or adjusted under 35 U.S.C. 154(b) by 530 days.

(21) Appl. No.: 14/342,394

(22) PCT Filed: Aug. 29, 2012

(86) PCT No.: PCT/IL2012/050335
§ 371 (c)(1),
(2), (4) Date: Mar. 3, 2014

(87) PCT Pub. No.: WO2013/030837
PCT Pub. Date: Mar. 7, 2013

(65) Prior Publication Data
US 2014/0214995 A1    Jul. 31, 2014

Related U.S. Application Data

(60) Provisional application No. 61/530,006, filed on Sep. 1, 2011.

(51) Int. Cl.
*H04L 12/58* (2006.01)
*G06Q 10/10* (2012.01)

(52) U.S. Cl.
CPC ........... *H04L 51/16* (2013.01); *G06Q 10/107* (2013.01)

(58) Field of Classification Search
CPC ....................................................... H04L 51/16

USPC ....................................................... 709/206
See application file for complete search history.

(56) References Cited

U.S. PATENT DOCUMENTS

| 7,178,099 B2 | 2/2007 | Meyer et al. |
| 7,596,603 B2 | 9/2009 | Chen et al. |
| 2006/0010217 A1 | 1/2006 | Sood |

(Continued)

FOREIGN PATENT DOCUMENTS

WO    WO 2013/030837    3/2013

OTHER PUBLICATIONS

International Preliminary Report on Patentability Dated Mar. 13, 2014 From the International Bureau of WIPO Re. Application No. PCT/IL2012/050335.

(Continued)

*Primary Examiner* — Vivek Srivastava
*Assistant Examiner* — Sibte Bukhari
(74) *Attorney, Agent, or Firm* — D. Kligler IP Services Ltd.

(57) ABSTRACT

A method of updating electronic mails (emails) data dataset that comprises providing a dataset which comprises a plurality of previously identified original message content blocks as a plurality of discrete units, each the original message content block having a header content and a sender content and being extracted from emails exchanged in a multi-email correspondence, receiving at least one additional email, analyzing the at least one additional email to identify a plurality of original message content blocks, tagging each of the plurality of original message content blocks as a discrete unit, and updating the dataset with the plurality of original message content blocks.

27 Claims, 9 Drawing Sheets

(56) References Cited

U.S. PATENT DOCUMENTS

| | | | | |
|---|---|---|---|---|
| 2009/0119678 A1* | 5/2009 | Shih | ....................... | G06Q 10/10 |
| | | | | 719/313 |
| 2010/0030798 A1* | 2/2010 | Kumar | .............. | G06F 17/30873 |
| | | | | 707/737 |
| 2012/0245925 A1* | 9/2012 | Guha | ....................... | G06F 17/27 |
| | | | | 704/9 |

OTHER PUBLICATIONS

International Search Report and the Written Opinion Dated Nov. 30, 2012 From the International Searching Authority Re. Application No. PCT/IL2012/050335.

* cited by examiner

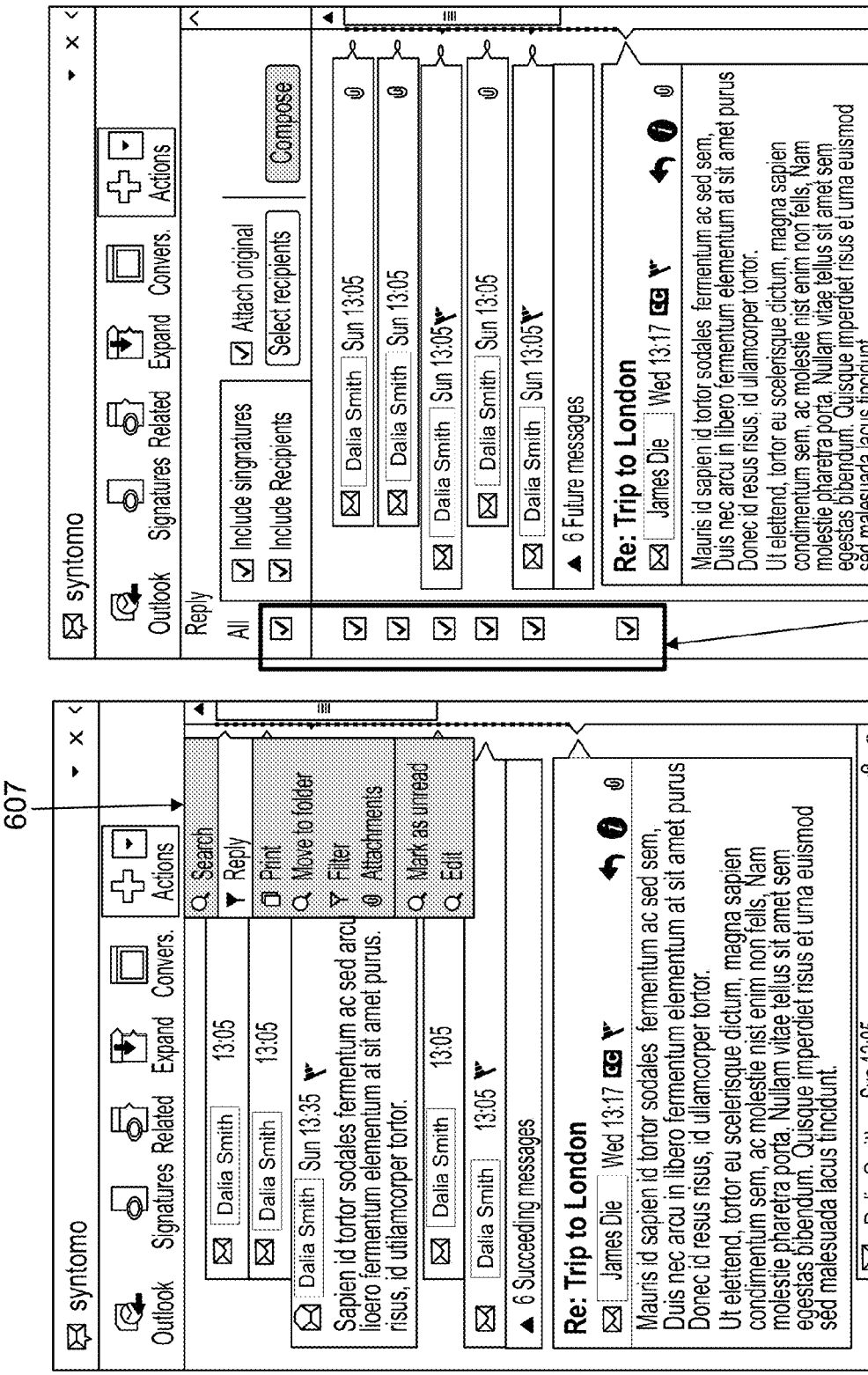

FIG. 5

ELECTRONIC MAIL DATA MANAGEMENT SYSTEMS AND METHODS FOR GENERATING A DATASET FOR SUCH SYSTEMS

RELATED APPLICATIONS

This application is a National Phase of PCT Patent Application No. PCT/IL2012/050335 having International filing date of Aug. 29, 2012, which claims the benefit of priority under 35 USC §119(e) of U.S. Provisional Patent Application No. 61/530,006 filed on Sep. 1, 2011. The contents of the above applications are all incorporated by reference as if fully set forth herein in their entirety.

FIELD AND BACKGROUND OF THE INVENTION

The present invention, in some embodiments thereof, relates to data management and, more particularly, but not exclusively, to systems and methods of creating an infrastructure for accessing and using Electronic mail (email) data.

Electronic mail, commonly called email or e-mail, is a method of exchanging digital messages from an author to one or more recipients. Modern email operates across the Internet or other computer networks. Email servers accept, forward, deliver and store messages.

Gmail™ and Microsoft OUTLOOK™ are exemplary messaging applications that enable users to exchange electronic mail messages through networked computers. Instant messaging ("IM") programs such as MSN MESSENGER and YAHOO!MESSENGER, which have gained popularity in recent years, exemplify another embodiment of messaging programs that enable users to exchange electronic messages in real-time through networked computers.

Electronic mail messages are often sent to and received by a group of recipients, which may be referred to as addressees.

Typically, during an email correspondence among a group of recipients, one or more of the recipients response to or forward received emails using reply, reply all, and forward commands, which generally includes copying the content of the received email into the reply message. As the number of electronic messages and replies increases, the duplicate content usually increases.

During the last year various solutions have been developed to manage email correspondences. For example U.S. Pat. No. 7,596,603 describes a process for composing and displaying a consolidated message document. The preferred embodiment of the invention is a computer program that configures a general-purpose computer to implement the inventive process.

SUMMARY OF THE INVENTION

According to some embodiments of the present invention, there is provided a method of updating electronic mails (emails) data dataset. The method comprises providing a dataset which comprises a plurality of previously identified original message content blocks as a plurality of discrete units, each original message content block having a header content and a sender content and being extracted from emails exchanged in a multi-email correspondence, receiving at least one additional email, analyzing the at least one additional email to identify a plurality of original message content blocks, tagging each one of the plurality of original message content blocks as a discrete unit, and updating the dataset with the plurality of original message content blocks.

Optionally, the providing comprises receiving a plurality of emails and extracting the plurality of previously identified original message content blocks therefrom.

Optionally, the providing comprises segmenting each previously identified original message content block to tag respective the header content and the sender content.

Optionally, the method comprises receiving a search query from a search engine and retrieving a list of original message content blocks from the dataset.

Optionally, the method comprises outputting a presentation combining at least some of the previously identified original message content blocks and the plurality of original message content blocks.

More optionally, the presentation is a table presentation having a header content column and a sender content column and wherein each line of the table represents another the original message content block.

More optionally, the presentation is a conversation presentation having a plurality of separate graphic objects wherein each graphic object represents another original message content block.

More optionally, the tagging comprises tagging at least one automatically added content, the outputting comprises at least one of concealing, editing, marking and removing the at least one automatically added content from the presentation.

More optionally, the tagging comprises tagging at least one non informative ritual text, the outputting comprises at least one of concealing, editing, marking and removing the non informative ritual text from the presentation.

More optionally, the tagging comprises identifying at least one uniform resource locator (URL) address, the outputting comprises replacing the uniform resource locator (URL) with hyperlink in the presentation.

Optionally, the method comprises sorting at least a group of original message content blocks from the dataset according to respective the header content and presenting the sorted group.

Optionally, the method comprises selecting an original message content block from the dataset, sending at least one of the selected original message content block and a previously received email including the selected original message content block as a new email, the new email being a member of a group consisting of a reply email, a forward email and a reply all email of the previously received email.

Optionally, the method comprises segmenting in each original message content block a sender content and a header content.

Optionally, the analyzing comprises identifying, in the content of the at least one additional email, a first portion which is intertwined with a second portion and associating the first portion with one of the plurality of original message content blocks and the second portion with another of the original message content blocks.

More optionally, method further comprises generating a presentation wherein a paragraph comprising the first portion is connected with other content of the one of the plurality of original message content blocks.

Optionally, the analyzing comprises identifying a group original message content blocks from the dataset as related to a certain multi-email correspondence and dividing the group to a plurality of subgroups; further comprising presenting each one of the plurality of subgroups as a correspondence branch of the certain multi-email correspondence.

Optionally, the analyzing comprises identifying a group original message content blocks, originated from different emails, from the dataset as related to a certain multi-email correspondence and; further comprising presenting the certain multi-email correspondence.

Optionally, the method comprises at least one of marking and tagging a respective original message content block in at least one of a forward message or a reply message of at least one of the emails.

Optionally, the method comprises at least one of marking and tagging at least one original message content block in a newly created email.

According to some embodiments of the present invention, there is provided a method of presenting electronic mails (emails) data. The method comprises providing a dataset which comprises a plurality of previously identified original message content blocks as a plurality of discrete units, each original message content block having a header content and a sender content and being extracted from emails exchanged in a multi-email correspondence, receiving a search query, analyzing the dataset to identify a group of the plurality of original message content blocks having a common characteristic that matches search query, and presenting a plurality of members of the group as a plurality of discrete units in response to the search query.

According to some embodiments of the present invention, there is provided a device of updating electronic mails (emails) data dataset. The device comprises a processor, a memory hosting a dataset which comprises a plurality of previously identified original message content blocks as a plurality of discrete units, each original message content block having a header content and a sender content and being extracted from a plurality of emails exchanged in a multi-email correspondence, an interface module which receives at least one additional email, and an updating module which analyzes the at least one additional email to identify a plurality of original message content blocks, tags each of the plurality of original message content blocks as a discrete unit, and updates the dataset with the plurality of original message content blocks.

Optionally, the plurality of emails are selected from an email managing application hosted by the device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3D and 3E are images of a graphical user interface that allows performing actions selected sequential original message content blocks, according to some embodiments of the present invention;

FIG. 5 is an image of a graphical user interface of an email with a multi-email correspondence and a window that presents original message content blocks of the multi-email correspondence, according to some embodiments of the present invention.

DESCRIPTION OF EMBODIMENTS OF THE INVENTION

Figure 1:
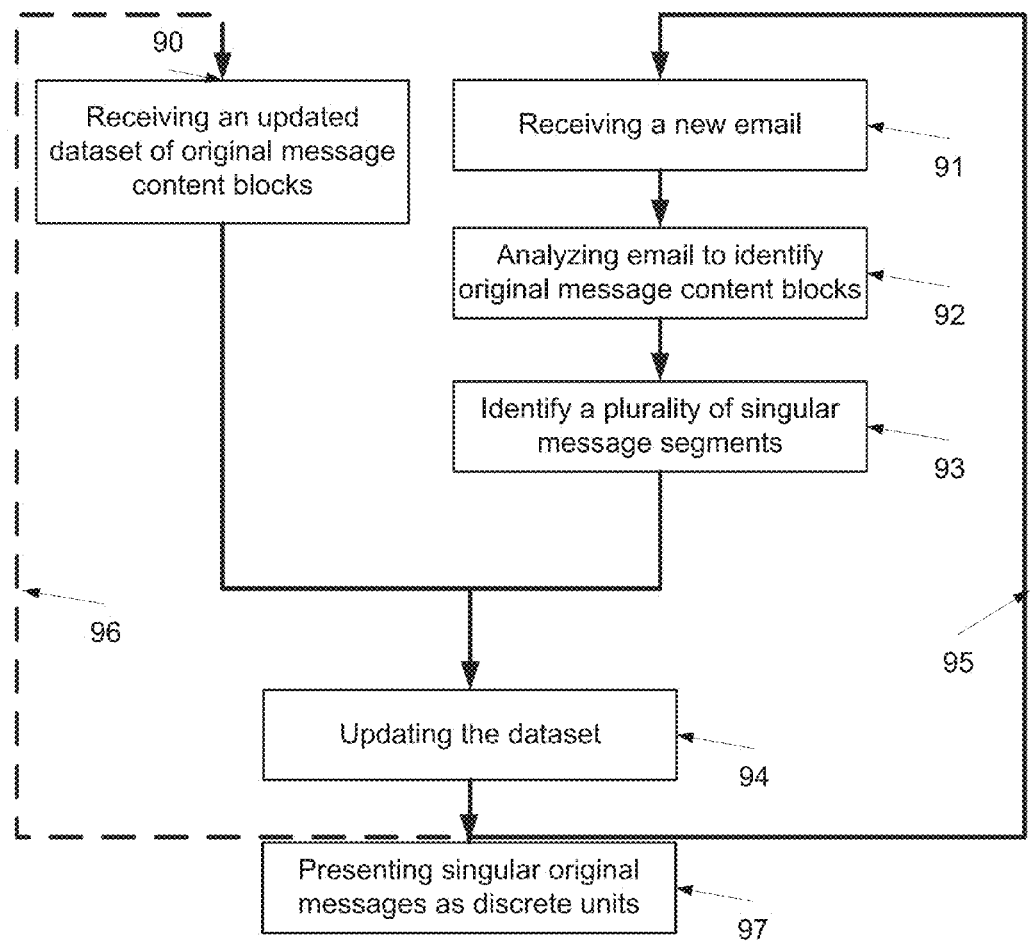
FIG. 1 is a flowchart of a method for presenting original message content blocks, which are extracted from a plurality of emails in a processing procedure, according to some embodiments of the present invention.

The present invention, in some embodiments thereof, relates to data management and, more particularly, but not exclusively, to systems and methods of creating an infrastructure for accessing and using email data.

Emails may be used for multidirectional communication among a plurality of participants, which may be referred to as addressees. A typical email in such a communication includes sender content added or created by its sender or by a handler application, such as a client terminal or email server(s), and one or more copies of the sender and/or header content of email messages previously distributed among the plurality of addressees. The sender content usually includes user content, such as a textual message or any other content, for instance images, files, graphics and/or the like, and/or one or more attachments. The sender content may include machine generated content added by a client terminal or email server(s) received time tags and/or signatures. A header content usually contains a title, information about who is the sender of the message, the recipient(s) of the message and the route. For example, the header may include some or all of the following fields: a Received field, the Date field, a From field, a Sender field, a To field, a CC field, a Subject field, an ID field, a Reply-to field, and/or X-Mailer field. Each of these fields is optionally defined as known in the art. The sender content and the header content, regardless to its location in the email, may be referred to herein as an original message content block. According to this terminology, an electronic mail which includes one or more copies of the content of email messages which were previously distributed among addressees includes a plurality of original message content blocks Such an email may be referred to herein as an email of a multi-email correspondence. As the number of emails in a multi-email correspondence increases, the duplicate content usually increases.

According to some embodiments of the present invention there are provided methods and systems of managing searchable dataset of original message content blocks, which are identified in a plurality of multi-email correspondences, or references thereto. The searchable dataset allows a user to perform separately one or more discrete unit actions on each of a plurality of original message content blocks of a certain multi-email correspondence. For example, the user may separately perform basic emailing actions such as reply, forward, and/or reply all, on each one of the original message content blocks of a certain multi-email correspondence. In addition, the dataset may be used to receive, in response to a search query, a list with matching original message content blocks. Additionally or alternatively, a user may remove message content blocks from one or more certain multi-email correspondences, move content blocks to other one or more certain multi-email correspondences, and/or add new content blocks to one or more certain multi-email correspondences. The database may also be used to sort email data based on matching original message content blocks, to display various correspondence branches of a multi-email correspondence, to avoid displaying various segments of email content, and/or present any sub group of the original message content blocks in an inbox view or any other view, such as a flowchart or a tree view.

According to some embodiments of the present invention, there are provided methods of updating such a dataset. When an email is received, it is analyzed to identify original message content blocks, for example using textual analysis including HTML analysis and/or analysis of attachments and/or analysis of embedded objects. The original message content blocks are tagged as discrete units and the dataset is updated therewith.

According to some embodiments of the present invention, there are provided methods and systems of presenting email data using such a dataset. In such embodiments, different portions of each original message content block may be identified, optionally segmented, and removed, concealed, or otherwise deemphasized. For example, the duplications of textual content and/or embedded objects may be identified and removed. In another example, portions such as the header content of the original message content block, automatically added text blocks and/or embedded objects, such as signatures, legal caveats, antivirus and/or firewall announcements, advertisements, sponsorships, break signs and/or non informative ritual text such as prefix and/or suffix greetings may be identified and removed and/or concealed. This process may be used to generate a coherent and relatively focused presentation of a multi-email correspondence that includes only content which is generated by the participants of the multi-email correspondence.

Optionally, in order to identify the original message content blocks, sender content of a participant in a multi-email correspondence that is intertwined with the sender content of another participant, for example in text commenting, is tagged. This allows separating the intertwined content to discrete units for presentation, searching, and/or sorting purposes, for example as further described below.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 5:
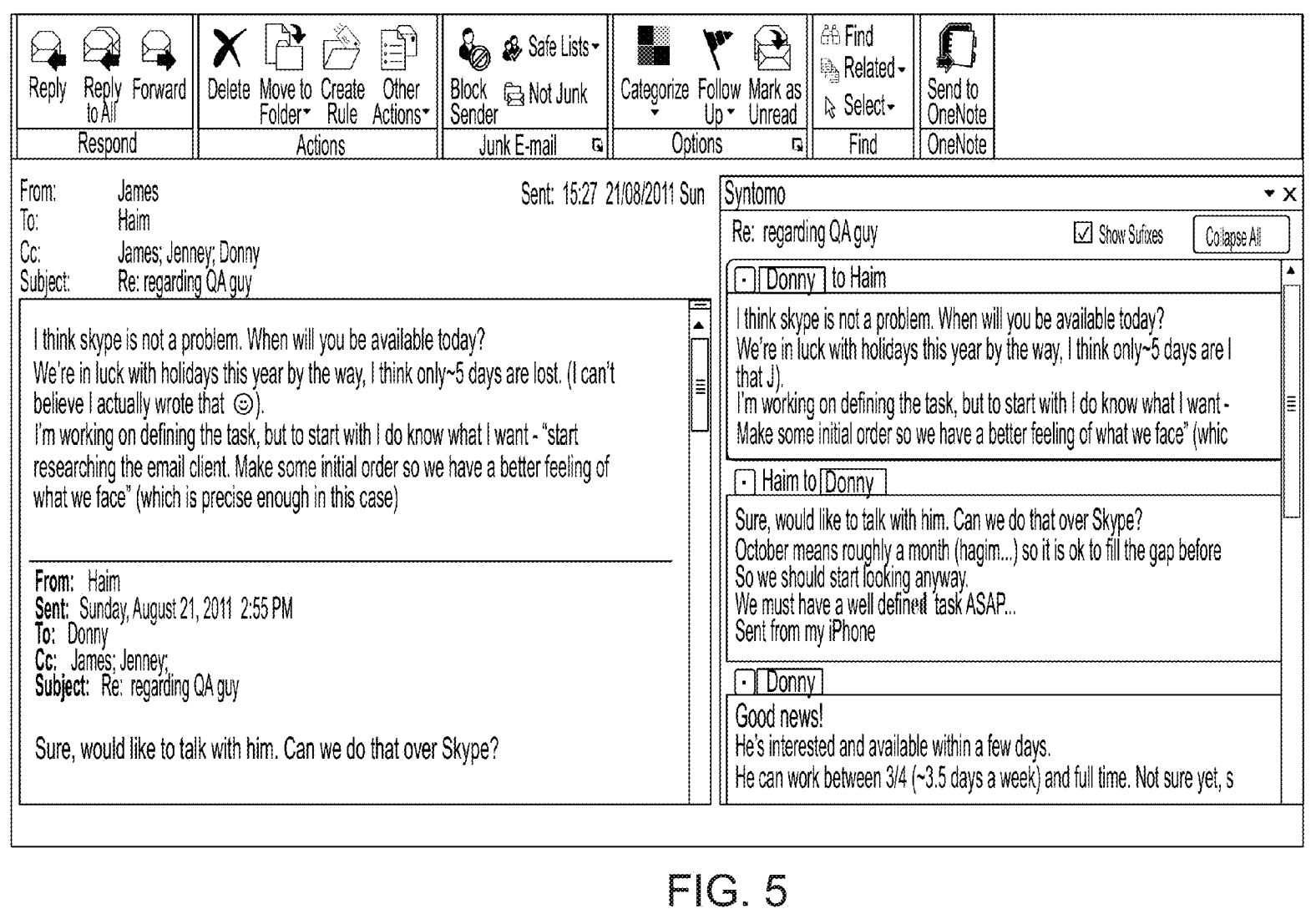

Reference is now made to FIG. 1, which is a flowchart 100 of a method for managing a dataset of email data based on the identification of original message content blocks as discrete units in a plurality of emails, according to some embodiments of the present invention. The dataset allows sorting, searching, and/or displaying original message content blocks which are extracted from multi-email correspondences, for example as described below, as discrete units. The method is optionally implemented as a stand-alone application, a cloud computing application, or can be executed on an email server for multiple users in an organization, such as shared mailboxes and calendars, and public folders. The method is optionally used to generate a support tool that is used in parallel with a personal information manager, such as Outlook™ from Microsoft™. In such embodiments, for example as depicted in FIG. 5, discrete units are presented in parallel to the presentation of related email correspondence(s). The method may be implemented by a management application that is executed on a client terminal with memory and a processor, such as a desktop, a laptop, a tablet, a Smartphone, and/or the like. The method may be implemented as an add-on application (e.g. by a way of plug-in) that is integrated on an existing email management application, such as Outlook™ and/or a browser hosted on a client terminal and/or on an email server and/or as a utility for printing correspondence in a compact manner by various applications for saving time and/or paper. The method may be implemented as a web service that is uploaded with messages and returns original message content blocks. For example, the method may be implemented by a server that receives emails (including the quoted text), recognizes its components (headers, signatures, suffixes etc.) and reply with original message content blocks which are extracted therefrom. The method may also be implemented as a widget (add-on) to a web-based email application (e.g. Gmail™). First, as shown at 90, a dataset of original message content blocks is provided. The dataset 90 may be locally stored on a client terminal and/or accessed via a network, for example stored in an email web server. The dataset 90 is optionally a duplication and/or a subset of folder(s) used to store electronic mail messages in a personal information manager, such as Outlook™ from Microsoft™.

Figure 2:
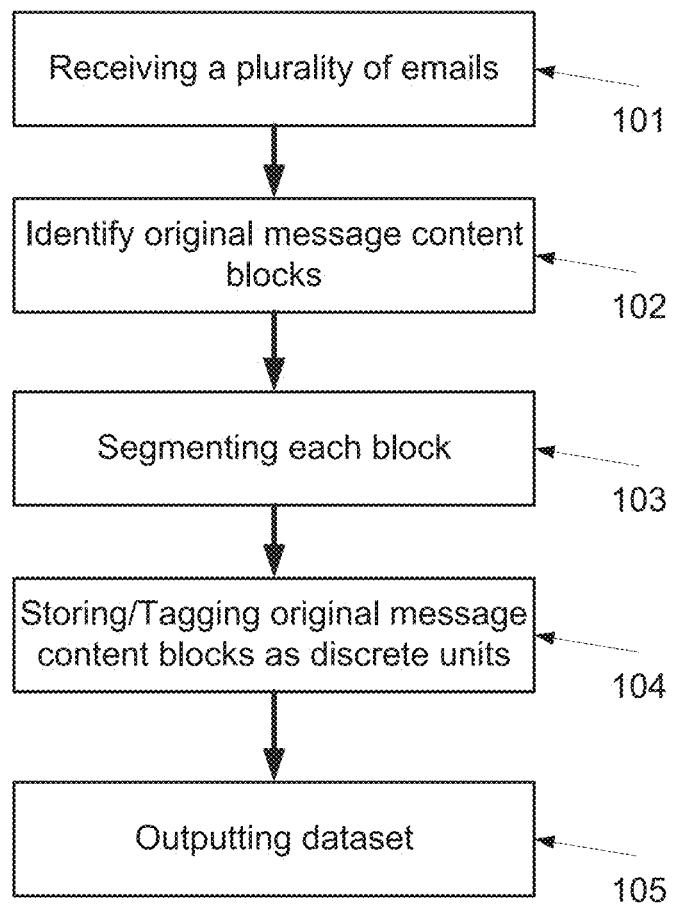
FIG. 2 is a method of a process for generating a dataset, according to some embodiments of the present invention.

For example, reference is now also made to FIG. 2, which is a method 100 of a process for generating a dataset that allows sorting, searching, and/or displaying original message content blocks, which are extracted from multi-email correspondences, according to some embodiments of the present invention. The original message content blocks may also be separately printed and/or sorted (not email based). First, as shown at 101, emails are received, for example selected, either automatically or manually. For example, a graphical user interface (GUI) that allows a user to select a group of emails for processing, for example from an email management application, such as Outlook™, is used. The dataset may be created from the beginning, without any previous data. In such an embodiment, each email is processed according to blocks 91-93, for example as described below.

Now, as shown at 102, the emails are analyzed to identify and optionally tag and/or separately store original message content blocks. The analysis is optionally performed by analyzing the text and/or embedded objects of each of the plurality of emails and/or the attachments.

Optionally, in order to identify original message content blocks in emails of multi-email correspondences, the headers of the plurality of original message content blocks are identified. The original message content blocks which are related to an email of a common multi-email correspondence may be tagged with a multi-email correspondence identifier, such as a unique ID.

Optionally, quoted original message content blocks which appear a number of times in the emails are processed as a single original message content block.

According to some embodiments of the present invention, as shown at 103, in each original message content block, a plurality of original message content block segments are identified, for example using a textual analysis module. Optionally, header content of each original message content block is identified, for example the header fields of an email that is quoted in the analyzed email. Optionally, the textual content of each original message content block is analyzed to identify automatically, and optionally tag, automatically added text blocks, such as signatures, legal caveats, antivirus and/or firewall announcements, advertisements, sponsorships, break signs, such as ">>>" and/or the like. Additionally or alternatively, the textual content and/or embedded objects of each original message content block are analyzed to identify automatically, and optionally tag non informative ritual text such as prefix and/or suffix greetings. Additionally or alternatively, the textual content of each original message content block is analyzed to identify automatically and optionally tag redundant spaces and empty lines. This allows marking each segment of the original message content block. For example, signatures and header fields may be marked, grayed and/or otherwise concealed so that the receiving user can read the message in a clearer manner. This may be done automatically, for example when an email that contains original message content block(s) is replied to and/or forwarded. The marking may be stored in the dataset and/or added before sending to recipient(s), for example in a new email message, as a reply message, and/or as a forward message. Optionally, the marking function is triggered when the user presses the send button and/or creates a new email.

Optionally, the user may manually segment portions of an original message content block, automatically added text blocks, non informative ritual text(s) and/or redundant spaces and empty lines. For example, the user may mark a certain text block as an automatically added text block, for example a signature and another text block as informative ritual text. Optionally, such user inputs are processed to update an automatic segmentation process that is managed by the textual analysis module. The manual segmentation may be performed at any time and/or presentation format. For example, a user may select and tag segments while reading an email of a multi-email correspondence that is presented thereto.

It should be noted that the identification of the boundaries of the original message content block(s) assists in the segmentation. For example, signatures and/or non informative ritual text(s) may be identified based on their proximity to these boundaries, for example in the end of original message content block(s).

Optionally, patterns of a sender, which are identified by statistical analysis, may be used for performing the segmentation. Such analysis may be used for identifying signatures, non informative ritual text and/or the like. Optionally, these patterns may assist in identifying the beginning of a following original message content block and/or current original message content block. This may be done based on the assumption that there is typically a header of some fixed format in the beginning of the original message content block(s). In another example, when no header of known form was identified, meta-data such as the references field may be indicative of the beginning of an original message content block not yet identified at a certain location in the content. A signature may provide a reassurance that this location is accurate. Message content block(s) may be printed in various formats, for example, what you see is what you get (WYSIWYG) and/or with one or more of the origin emails.

According to some embodiments of the present invention, sender content that is intertwined with copied content, for example in-text comments and/or answers, may be automatically identified. An example of in-text comments is depicted by numerals 198, 199 in FIG. 3A. In such an embodiment, original message content blocks with new noncontinuous textual content are identified and optionally tagged. The copied textual content may be stored as part of the original message content block, optionally with a certain mark, for example marked to be colored in a different color, marked with italic and/or the like. Optionally, the intertwined content is identified by comparing content between two or more of the emails, optionally based on the location of the textual content in the analyzed email. This allows identifying segments which are partly similar.

It should be noted that identifying original message content block(s) in an email facilitates identifying inline-text comments. Once it has been verified that a certain original message content block in an email is the same original message content block(s) in previous email(s), the difference between the content of the two may be determined and in addition, in some cases, identify who wrote the comment.

As shown at 104, the original message content blocks or pointers thereto are tagged, for example separately stored in a searchable dataset, as discrete units, for example as indexed records. Optionally, each original message content block is stored as a separately accessible file or record. The storing is performed to allow querying for original message content blocks which comply with a certain search query, for example including a certain term, send and/or received in a certain period, and/or the like. Optionally, the original message content blocks are indexed in a manner that allows prompt sorting thereof, for example indexed according to the send date and time. Optionally, the original message content blocks are stored in a manner that allows presenting related conversations. For example, the original message content blocks and the relations between them are stored in a dataset that facilitates the presentation thereof in a tree structure. Optionally, the segments of the original message content blocks are stored or marked as connected discrete units to facilitate the editing, the sorting, the concealing, the coloring, and/or the marking thereof without undue computation.

Then, as shown at 105, the data set is outputted, for example being accessible to search engine modules and/or display modules, optionally with sorting abilities.

Reference is now made, once again, to FIG. 1. When a new email which is part of a multi-email correspondence is received, as shown at 91, it is analyzed for identifying the original message content blocks, as shown at 92. The analysis is performed as described above in relation to block 102. As shown at 93, the original message content block is segmented and, optionally as described above in relation to 103. Now, as shown at 94, the received dataset is updated. As shown at 95, the process depicted in FIG. 1 may be repeated per email of a certain multi-email correspondence. In such a manner, as conceptually shown at 96, the dataset remains updated.

As shown at 97, some or all of the plurality of original message content blocks in the dataset may be presented as discrete units, for example as a list, for example similarly to an inbox, and/or clustered and presented as groups of separate multi-email correspondences. For example, the presentation includes a list of separate multi-email correspondences wherein a selection of one of the multi-email correspondences facilitates access to any of the related plurality of original message content blocks as a discrete unit. In another example, a plurality of original message content blocks are presented, and optionally sorted, in an inbox table view wherein each line in the table view is another original message content block. In particular, each line includes fields (i.e. the From field, the Subject field, the date field, and the Received field) which are filled in from information that is segmented in another single original message content block.

Figure 3A:
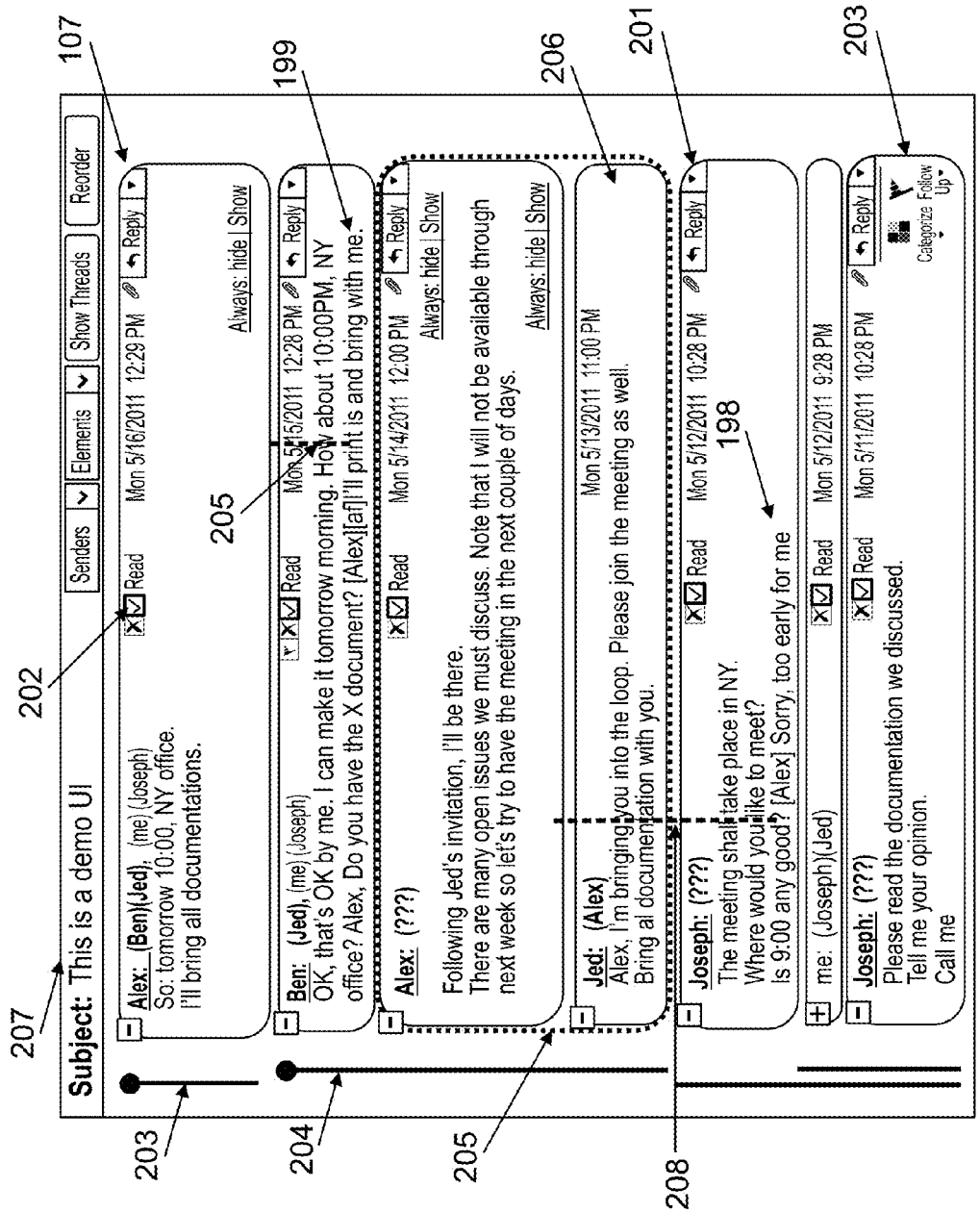
FIG. 3A is a schematic illustration of a text box presentation of sequential original message content blocks of a multi-email correspondence, according to some embodiments of the present invention.

Optionally, the presentation is an interactive presentation that allows a user to designate any of the original message content blocks for common messaging actions, such as reply and forward, and multi-email correspondence messaging actions, such as reply all, for example, see numeral 201 in FIG. 3A. The selected original message content block is optionally encapsulated as an email, for example, based on data from the header segment thereof, and sent to one or more addressees based on the user selection. The selected original message content block is optionally sent as an attachment so that the recipient can identify the original message content block. Optionally, each one of the plurality of original message content blocks may be marked as read or not read by the user, for example, see numeral 202 in FIG. 3A. Optionally, each one of the plurality of original message content blocks may be labeled for follow up and/or categorized as an email today, see numeral 212 in FIG. 3A. Flagged content and/or categorization may be managed as flagged and/or categorized emails.

Optionally, the plurality of original message content blocks are automatically prioritized according to respective metadata found in the quoted content of emails. For example, message content blocks may be automatically prioritized according to the actual provider of the content in the message content blocks, regardless of the sender of the email from which it is taken. In such a manner the prioritization is not affected by the sending entity—only by the content provider identity (e.g. email that is forwarded by a certain entity is prioritized according to another entity).

The prioritization may also be done according to other metadata records, such as message content block sending time, addressees and/or or the like.

Optionally, a multi-email correspondence is stored and/or sent as a single email message that includes a plurality of separately addressed units, the original message content blocks.

Optionally, a multi-email correspondence is stored and/or sent in a representation that allows the presenting thereof on systems that do not support original message content blocks management, for example as an image file that is sent as an attachment of a single email message and/or as a linked image file.

Figure 3B:
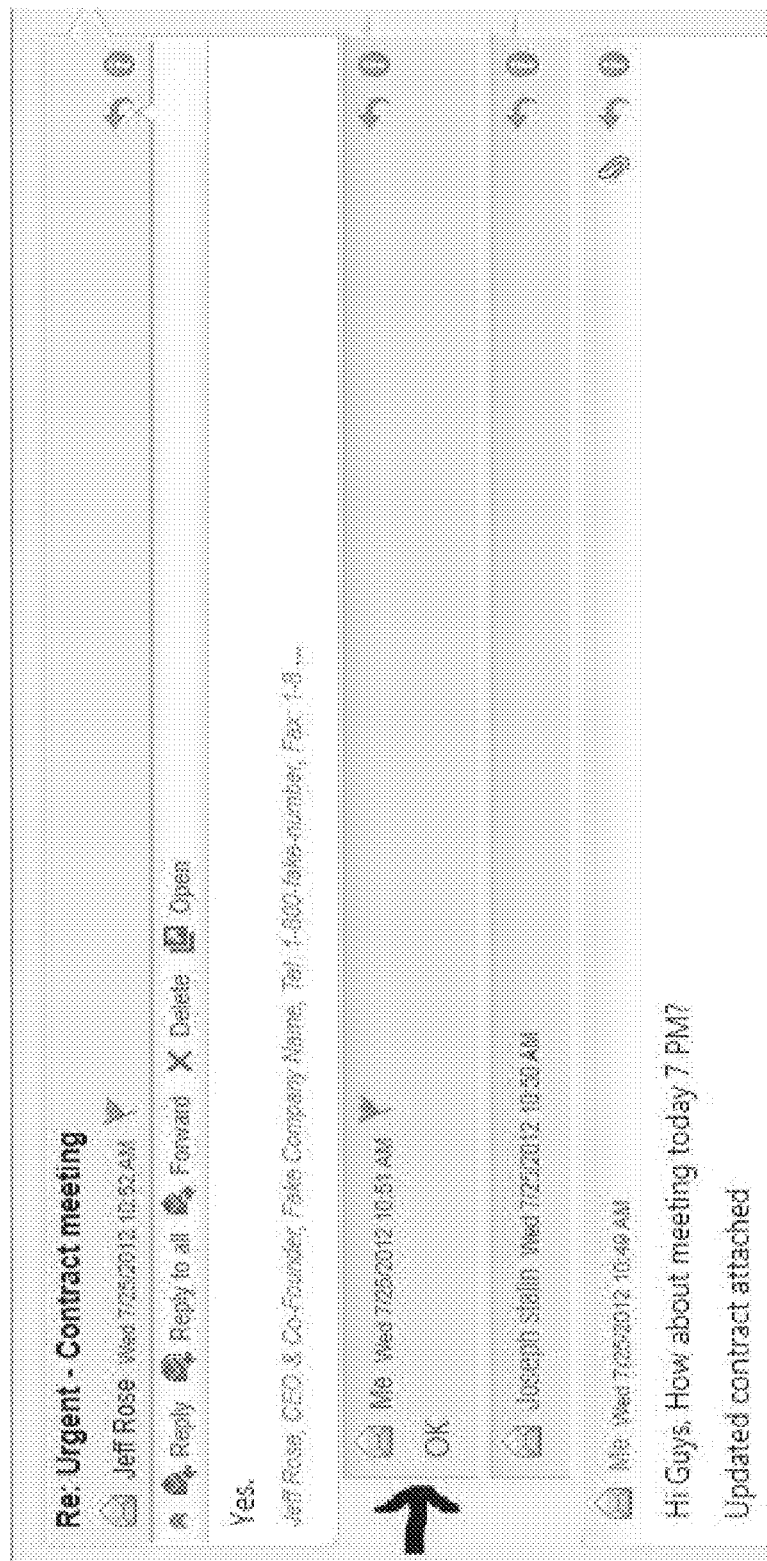
FIGS. 3B and 3C are images of a graphical user interface of sequential original message content blocks of a multi-email correspondence, according to some embodiments of the present invention.
Figure 3C:

According to some embodiments of the present invention, a number of correspondence branches are identified in a multi-email correspondence, for example in one or more related emails. The correspondence branch is optionally defined herein as a sequence of original message content blocks denote $x_1, x_2 \ldots x_n$, where $x_{i+1}$ (i=1, ..., n) denotes an original message content block sent in as a reply message for a forwarded message after the reception of $x_i$. Optionally, each correspondence branch is separately marked. For example, in FIG. 3A, each one of axes 203, 204 represents another correspondence branch. A line is drawn along a certain axis where a presented text box includes content from a related original message content block. A gap, which remains along a certain axis of presented text boxes, indicates that one or more presented text boxes which are presented in parallel do not include content from a related original message content block. Optionally, the user may select which correspondence branches to present. Related messages may also be presented in different alignment, for example as shown at FIG. 3B wherein a message content block that appears in another thread of the multi-email correspondence and having a common ancestor is presented in a different alignment than a reference message content block. It should be noted that as depicted in FIGS. 3B and 3C, the view depends on the selected message content block and not on the origin email.

Figure 4:
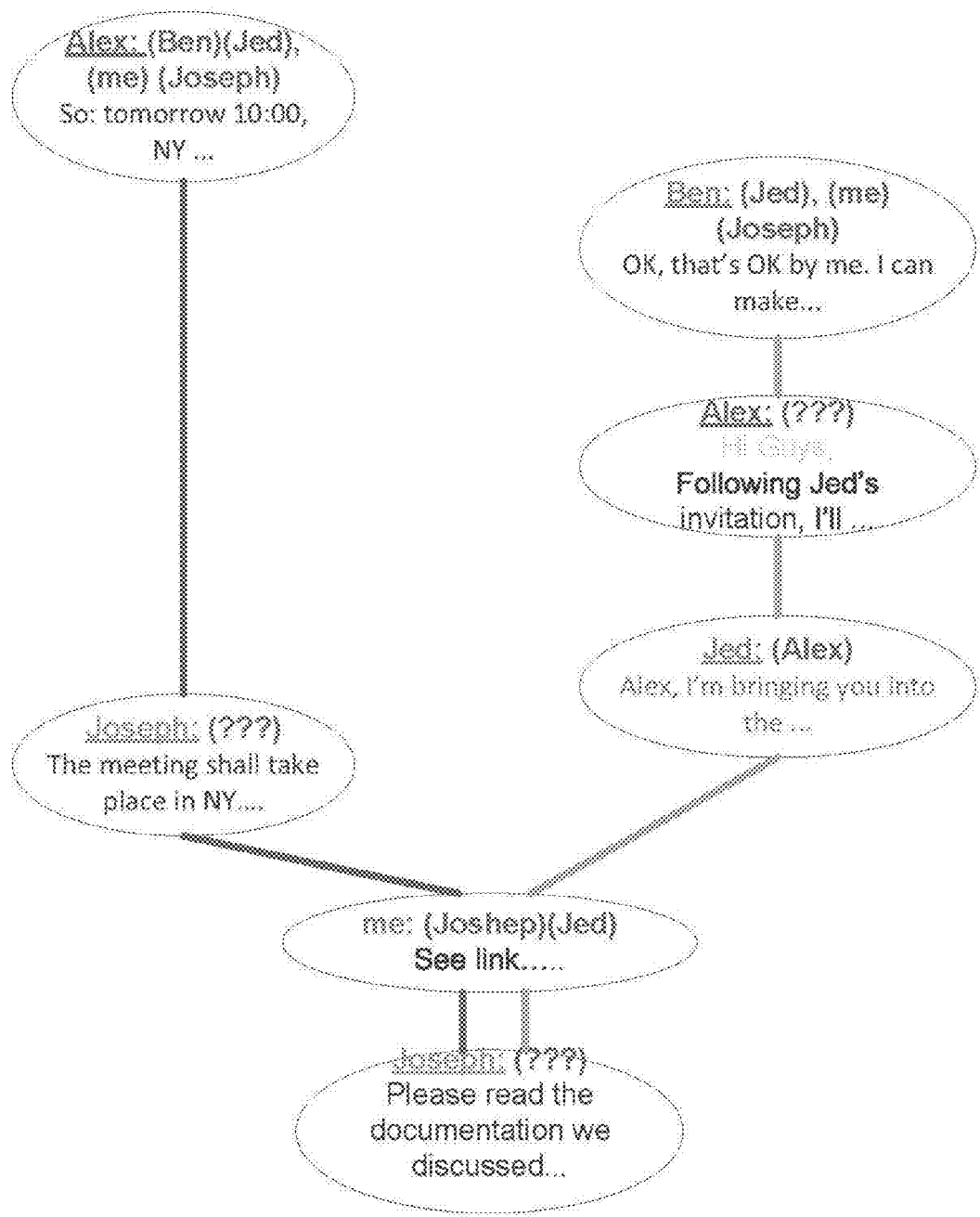
FIG. 4 is a schematic illustration of a flowchart presentation of original message content blocks of a multi-email correspondence, according to some embodiments of the present invention.

Optionally, a multi-email correspondence is mapped according to the identification of copies of one or more original message content blocks in a number of emails and combining data from these emails accordingly. For example, consider a simple case where two emails contain a certain original message content block. Clearly in such case the two emails belong to the same conversation. The order of emails may be determined according to the location of the original message content blocks in the emails. This logic may be extended to many cases using a set of rules, for example full containment of original message content blocks, the containment of latest x original message content blocks and/or the like. Optionally, the chronological flow of original message content blocks in multi-email correspondence, which may also be referred to as a conversation, is demonstrated by arranging the original message content blocks in a conversation tree with multiple conversation-branches. The chronological flow may be presented in various flowcharts and/or diagrams which detail the development and the distribution of original message content blocks in the multi-email correspondence, for example as shown in FIG. 4. The presentation provides a full picture of the content provided by different addressees along a common timeline and relations between them.

In another example, original message content blocks are presented as discrete units in the presentation of content of a certain email. For example, FIG. 5 depicts a window presentation of each of a plurality of original message content blocks of a certain email. The original message content blocks are presented as graphical objects, such as content boxes, or text boxes. Optionally, the original message content blocks in the email are identified and optionally segmented, as described above. This allows marking each original message content block in a forward message or a reply message of the email. In another embodiment, marks and/or instructions which are indicative of the original message content blocks and optionally the segments thereof are added to the reply and/or forward message. This allows the recipient module to edit the presentation accordingly. For example, header content may be grayed or completely concealed, based on the definitions of the recipient module. Optionally, the recipient module functions according to instructions from a user.

Optionally, the plurality of original message content blocks may be sorted by any field in the presented column (i.e. the From field, the Date field, the Subject field, and the Received field) and/or any identified segment thereof. For example, the plurality of original message content blocks may be arranged from the last sent original message content block to the last received original message content block and/or vice versa.

Optionally, a multi-email correspondence presentation is generated and/or presented in response to a selection of an original message content block segment, for example when a plurality of original message content block segments are presented in an inbox view. In such a manner, the user can receive information about a relation between the selected original message content block and other original message content blocks in the inbox.

Optionally, features, such as automatically added text blocks, headers, non informative ritual text, manual signatures, and/or redundant spaces and/or empty lines are identified and removed and/or hidden from the presentation of the multi-email correspondence and/or visually deemphasized, for example blurred, colored in a light hue, and/or reduced in size. Optionally, features, such as images or video files are compressed or replaced with a link thereto. For example, FIG. 3A depicts an exemplary presentation of a multi-email correspondence with original message content blocks from five exemplary addressees (the user, which is marked as "me", Alex, Ben, Jed, and Joseph). The original message content blocks are processed according to the aforementioned segmentation so that headers and automatically added text blocks are removed. As used herein, automatically added text blocks include manually generated text box which are usually provided automatically, such as signatures and legal caveats. As shown in numeral 201, a read status may be added to the display of each one of the original message content blocks. As shown in numeral 202, a flag may be added to the display of each one of the original message content blocks to mark the importance thereof. Optionally, as shown at 107, action buttons are added to each graphical object, such as a text box, for example reply and forward. This allows a user perform basic functions such as forwarding, replying, and replying all, with respective to the content of a selected original message content block. FIG. 3D depicts a designated message content block tab 607 with a number of optional message content block actions to select from. FIG. 38 depicts selection boxes 608 that allow selecting on which message content blocks the actions are applied, for example which message content blocks are added to a reply, filtered, moved, and provided as attachment and/or the like.

Figure 6:
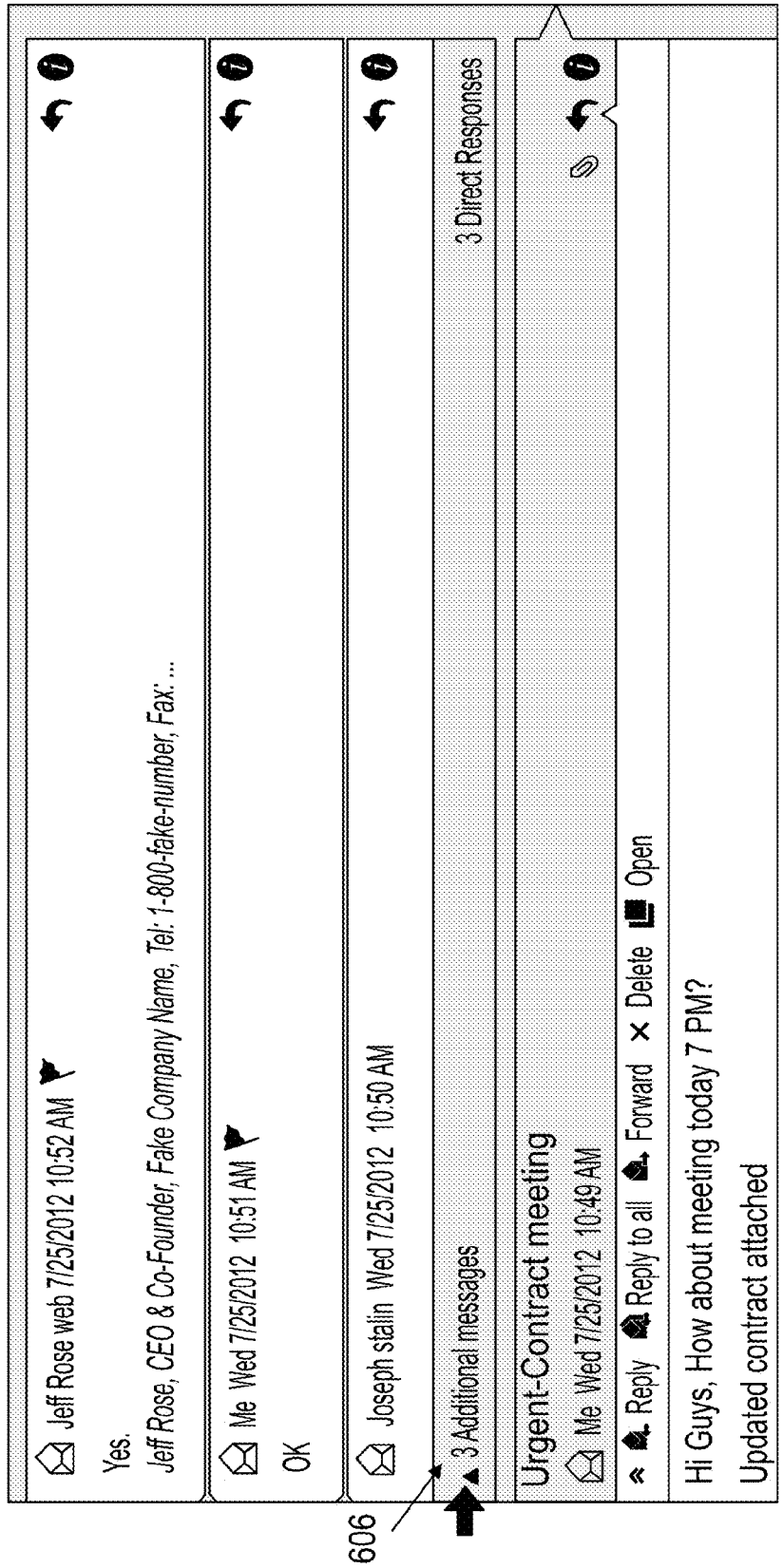
FIG. 6 is an image of a graphical user interface of an email with a multi-email correspondence and a window that presents original message content blocks ordered according to their time tag, according to some embodiments of the present invention.

Optionally, original message content blocks are ordered according to their time tag as a sequence of discrete units in the presentation of content of a certain multi-email correspondence. Optionally, as shown at FIG. 6, the original message content blocks are ordered one on top of the others as tabs. The user can see which original message content blocks precede (past) and/or succeed (future) others. Optionally, an ordering numerator 606 is added to indicate how many message content blocks precedes (past) and/or succeeds (future) a currently viewed message content block.

Optionally, as shown at 207, a title may be given to the multi-email correspondence, for example based on the last and/or first original message content block.

Optionally, in the presentation or a preprocessing before the presentation, references, such as uniform resource locator (URL) addresses, real addresses or unique terms or names are converted to hyperlinks. This allows replacing the references with hyperlinks that either reduce the volume of text of the respective original message content block, for example a hyperlink instead of a URL, and/or provides a user with a linkage to more information, for example a hyperlink to a map of an address and/or to contact details of a certain name, and/or enhances the original message content block view, for example adding a hyperlinked picture of a certain venue, such as the Eifel tower, which is mentioned in the text.

Optionally, the presentation format of a multi-email correspondence is determined by the user, for example using viewing options of an email application that executes the method depicted in FIG. 1. Optionally, the presentation of original message content blocks may be merged, for example when content of a certain original message content block is intertwined with the content of another, for example as described above (i.e. in text commenting). In such an embodiment, content from different original message content blocks may be marked differently.

Optionally, when content of a certain original message content block is intertwined with the content of another a graphical indicator, such as a line may be used for indication. In FIG. 3A, the graphical indicator 208 connects between separated and intertwined content of an original message content block.

Optionally, an indication of the origin of an original message content block may be depicted in the presentation. For example, as shown at 205, original message content blocks from the same email are connected, for example by dotted lines where the older original message content block is marked as an annex to the newer original message content block, for example colored in gray 206.

Optionally, the user may select a presentation for original message content blocks from or to a certain addressee. For example, the user may select a pink font or textbox for original message content blocks from addressee X and a green font or textbox for original message content blocks from addressee Y.

Optionally, the user may change the presentation for original message content blocks, for example by marking certain segments in a presented email.

It is expected that during the life of a patent maturing from this application many relevant systems and methods will be developed and the scope of the term a server, a client terminal, and an application is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of updating electronic mails (emails) data dataset, comprising:
    providing a dataset which comprises a plurality of previously identified original message content blocks as a plurality of discrete units, each said original message content block having a header content item and a sender content item extracted from emails exchanged between at least some of a plurality of participants of a multi-email correspondence;
    receiving an additional email related to said multi-email correspondence;
    analyzing said additional email to identify a plurality of original message content blocks having different original sending times;
    tagging each one of said plurality of original message content blocks as a discrete unit;
    updating the dataset of the multi-email correspondence with said plurality of original message content blocks, while removing duplications;
    segmenting the original message content blocks to mark non-informative segments of the original message content blocks; and
    initiating presentation of the multi-email correspondence, without duplicate message content blocks, along a common timeline, on a display of a smartphone, in a conversation presentation in which the content of a plurality of non-duplicate original message content blocks are displayed together next to each other on the display, with each original message content block, having a different original sending time, in a separate graphic object,
    wherein the original message content blocks are presented with the marked non-informative segments removed, concealed or deemphasized, and
    wherein initiating presentation of the multi-email correspondence comprises identifying at least one uniform resource locator (URL) address, and replacing said uniform resource locator (URL) with a hyperlink in said presentation.

2. The method of claim 1, wherein said providing comprises receiving a plurality of emails and extracting said plurality of previously identified original message content blocks therefrom.

3. The method of claim 1, wherein said providing comprises segmenting each said previously identified original message content block to tag respective said header content item and said sender content item.

4. The method of claim 1, further comprising receiving a search query from a search engine and retrieving a list of original message content blocks from said dataset.

5. The method of claim 1, wherein segmenting the original message content blocks to mark non-informative segments comprises marking content automatically added to a plurality of emails in the multi-email correspondence.

6. The method of claim 1, wherein segmenting the original message content blocks to mark non-informative segments comprises marking at least one non informative ritual text.

7. The method of claim 1, further comprising sorting at least a group of original message content blocks from said dataset according to respective said header content and presenting said sorted group.

8. The method of claim 1, further comprising selecting an original message content block from said dataset, sending at least one of said selected original message content block and a previously received email including said selected original message content block as a new email, said new email being a member of a group consisting of a reply email, a forward email and a reply all email of said previously received email.

9. The method of claim 1, further comprising segmenting in each of a plurality of emails of said multi-email correspondence a plurality of original message content blocks and segmenting each said original message content block to respective said sender content item and a respective said header content item.

10. The method of claim 1, wherein said analyzing comprises identifying, in the content of said additional email, a first portion included in the dataset, which is intertwined with a second portion not included in the dataset, and associating said first portion with one of said plurality of original message content blocks and said second portion with another of said original message content blocks.

11. The method of claim 10, further comprising generating a presentation wherein a paragraph comprising said first portion is connected with other content of said one of said plurality of original message content blocks.

12. The method of claim 1, wherein said analyzing comprises identifying a group of original message content blocks from said dataset as related to a certain multi-email correspondence and dividing said group to a plurality of subgroups; further comprising presenting each one of said plurality of subgroups as a correspondence branch of said certain multi-email correspondence.

13. The method of claim 1, wherein said analyzing comprises identifying a group of original message content blocks, originated from different emails, from said dataset as related to a certain multi-email correspondence and;
further comprising presenting said certain multi-email correspondence.

14. The method of claim 1, further comprising prioritizing said plurality of original message content blocks according to metadata from said additional email.

15. The method of claim 1, further comprising arranging said original message content blocks according to their sending time and presenting said original message content blocks in an arranged manner.

16. The method of claim 15, further comprising presenting a content of a selected original message content block from said original message content blocks and indicating how many of said original message content blocks have a sending time which precedes or succeeds said selected original message content block.

17. A non-transitory computer readable medium comprising computer executable instructions adapted to perform the method of claim 1.

18. The method of claim 1, further comprising at least one of marking and tagging a respective original message content block in at least one of a forward message or a reply message of at least one of said emails.

19. The method of claim 1, further comprising at least one of marking and tagging at least one original message content block in a newly created email.

20. A device of updating electronic mails (emails) data dataset, comprising:
a memory hosting a dataset which comprises a plurality of previously identified original message content blocks as a plurality of discrete units, each said original message content block having a header content item and a sender content item extracted from a plurality of emails exchanged between at least some of a plurality of participants of a multi-email correspondence;
an interface which receives at least one additional email related to said multi-email correspondence; and
one or more processors configured to analyze said additional email to identify a plurality of original message content blocks having different original sending times, to tag each of said plurality of original message content blocks as a discrete unit, to update said dataset of the multi-email correspondence with said plurality of original message content blocks, to segment the original message content blocks to mark non-informative segments of the original message content blocks, and to initiate presentation of the multi-email correspondence along a common timeline on a display of a smartphone in a conversation presentation, in which the content of a plurality of original message content blocks having different original sending times are displayed together next to each other on the display, with each original message content block in a separate graphic object,
wherein the original message content blocks are presented with the marked non-informative segments removed, concealed or deemphasized, and
wherein the one or more processors are additionally configured to identify at least one uniform resource locator (URL) address in the multi-email correspondence, and replace said uniform resource locator (URL) with a hyperlink in said presentation.

21. The device of claim 20, wherein said plurality of emails are selected from an email managing application hosted by said device.

22. The method of claim 10, wherein initiating presentation of the multi-email correspondence comprises separating the intertwined content to discrete units for presentation.

23. The method of claim 1, wherein analyzing the additional email to identify a plurality of sender content items comprises identifying duplications between different emails as a single original message content block.

24. The method of claim 1, wherein analyzing the additional email to identify a plurality of sender content items comprises identifying headers of email messages in the additional email message.

25. The method of claim 1, wherein analyzing the additional email to identify a plurality of sender content items comprises identifying for one or more first original message content blocks, related second original message content blocks sent as a forwarding or a reply to the first original message content block.

26. The method of claim 25, wherein initiating presentation of the multi-email correspondence comprises presenting the original message content blocks along with indications of respective correspondence branches to which the presented original message content blocks belong, wherein a correspondence branch includes a sequence of content blocks in which each content block was send as a reply or forwarding of an immediately previous content block in the correspondence branch.

27. The method of claim 25, wherein initiating presentation of the multi-email correspondence comprises presenting the original message content blocks along with action buttons allowing a user to forward or reply the email corresponding to the content block.

* * * * *